H. E. SCHANK.
ENGINE MOUNTING.
APPLICATION FILED SEPT. 25, 1919.
1,391,697.
Patented Sept. 27, 1921.
2 SHEETS—SHEET 1.
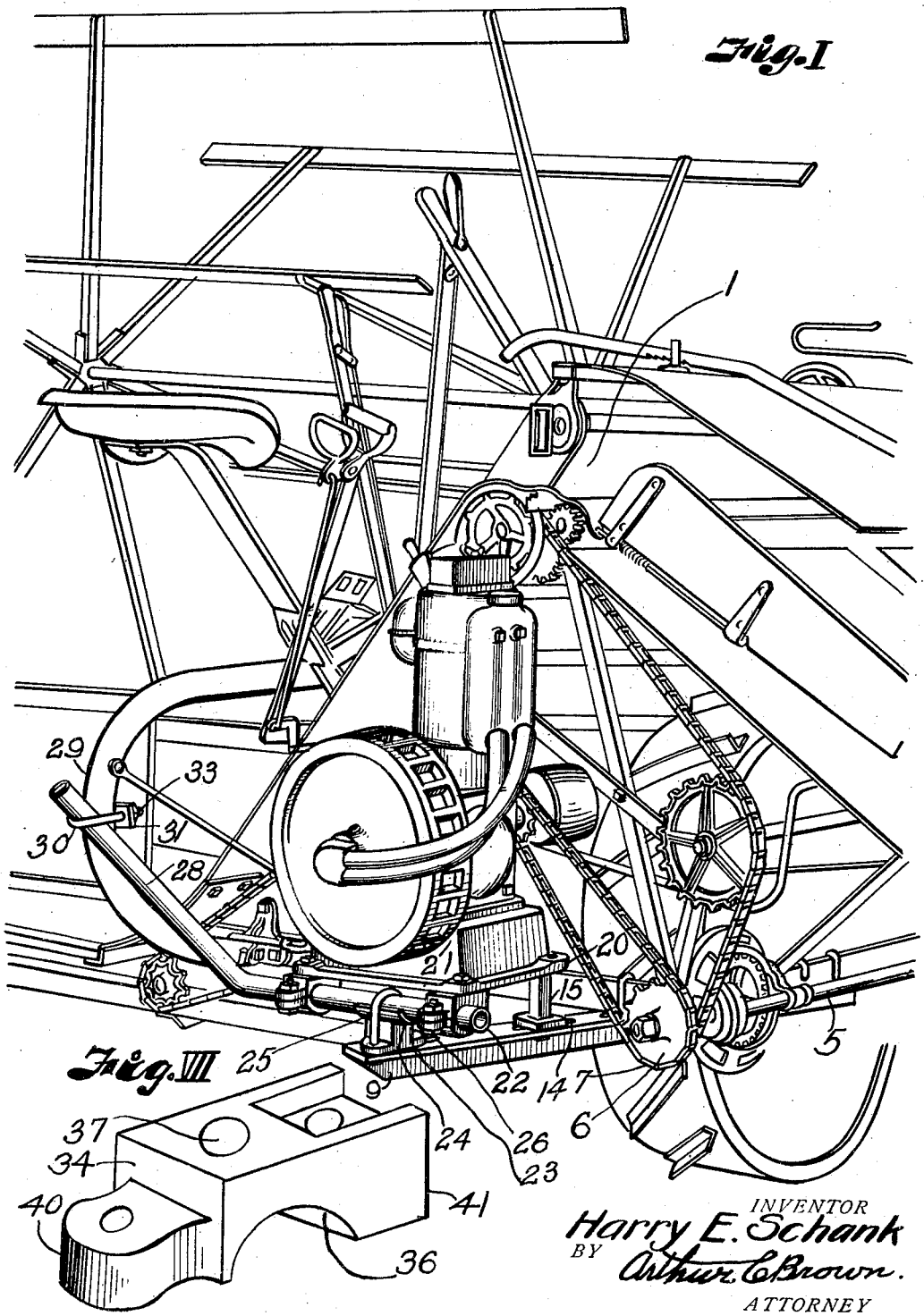
Fig. I
Fig. II
INVENTOR
Harry E. Schank
BY Arthur E. Brown.
ATTORNEY

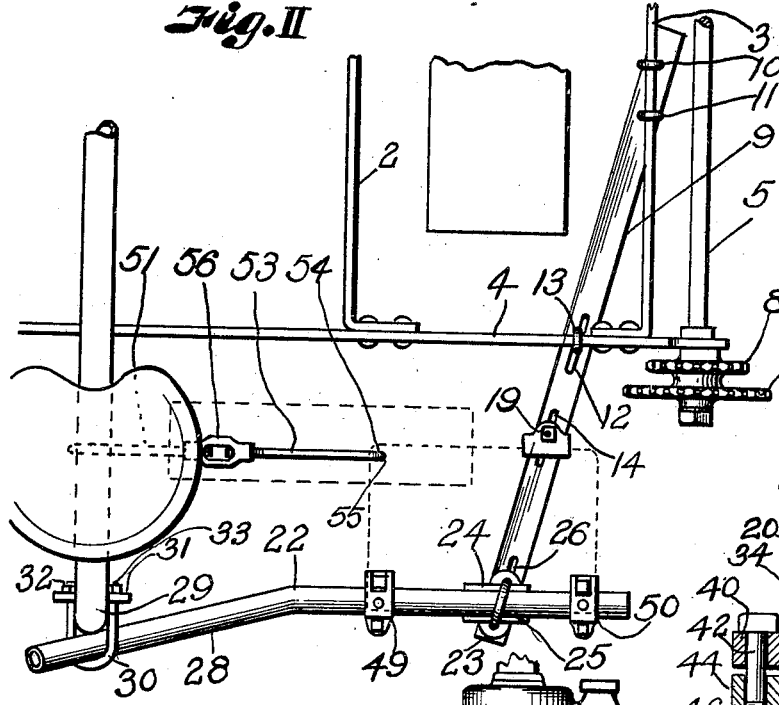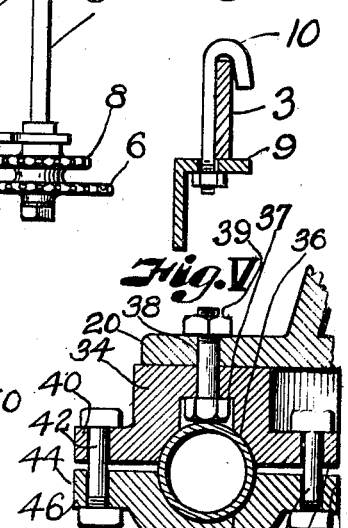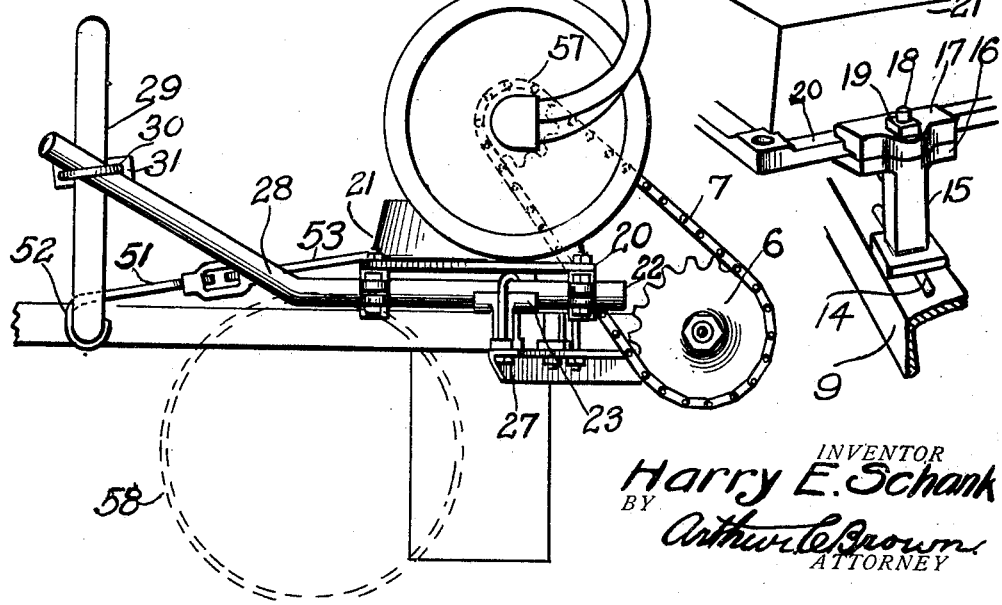

UNITED STATES PATENT OFFICE.

HARRY E. SCHANK, OF TOPEKA, KANSAS, ASSIGNOR TO THE PIERSEN MANUFACTURING COMPANY, OF TOPEKA, KANSAS, A CORPORATION OF KANSAS.

ENGINE-MOUNTING.

1,391,697.   Specification of Letters Patent.   Patented Sept. 27, 1921.

Application filed September 25, 1919. Serial No. 326,405.

*To all whom it may concern:*

Be it known that I, HARRY E. SCHANK, a citizen of the United States, residing at Topeka, in the county of Shawnee and State of Kansas, have invented certain new and useful Improvements in Engine-Mountings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to engine mountings for agricultural machines and particularly for harvesters and other portable farm machines adapted to be propelled over the ground by power other than that utilized for driving the operating mechanism of the agricultural machine.

The invention particularly contemplates the provision of means for standardizing the engine mounting to adapt it for differently constructed machines as well as to provide means for accurately positioning the engine on machines having the same general characteristics as to type. For convenience, the invention will be described in connection with a harvesting machine.

On account of the frailty of the harvester superstructure, it has been deemed expedient to mount the engine for driving the operating parts of the harvester mechanism upon the rear of the main frame, as this is best adapted to withstand the shocks and stresses due to the vibration of the engine when in operation.

While all harvester or binder manufacturers follow a more or less uniform plan of construction, the constructions of different makes of machines vary sufficiently to present difficulties in applying the same type of engine to all of them unless some provision is made to compensate for the variations found in the frames, and I have, therefore, provided an engine mounting which is adapted to be applied to any type of machine in the most convenient manner without requiring any special tools or any special knowledge of mechanics on the part of the operator installing the same.

I have also provided means for easily effecting minor adjustments on harvesters of the same type and an important feature of my invention also contemplates the provision of means for stabilizing the engine with respect to the frame, the stabilizer being easily adjustable to permit proper clearances and allow the engine base to be shifted to accurately locate it with respect to the coöperating mechanism which it operates.

In the drawings,

Figure I is a fragmentary perspective view of a harvester to which my invention is applied.

Fig. II is a fragmentary top view of the engine mounting, the engine being removed.

Fig. III is an end view of the mounting, showing the engine in place.

Fig. IV is a sectional view through a bar on the rear frame of the harvester and through a supporting bar for the engine bed, the connecting element being shown in elevation.

Fig. V is a sectional view through a clamp for connecting the engine bed to the stabilizer.

Fig. VI is a perspective view of an engine bed supporting standard, and

Fig. VII is a detail perspective view of the top member of the clamp shown in Fig. V.

Referring now to the drawings by numerals of reference:

1 designates a harvester of approved construction, provided with a rear end frame, shown as substantially rectangular and provided with side bars 2 and 3 connected by the transverse end bar 4, the frame carrying a shaft 5 provided with a sprocket 6 which may receive motion from a chain belt 7 driven from the engine, as will be explained hereinafter.

Extending diagonally across a corner formed by the bars 3 and 4 is a supporting beam, illustrated as consisting of an angle bar 9 connected to the bar 3 by suitable clamping members 10 and 11, which may be either U bolts or J bolts; and by reference to Fig. II, it will be observed that the beam 9 is longitudinally slotted, as at 12, to receive the U bolt 13 engaging the bar 4 so that by loosening the fastening members on the bolts 10, 11 and 13, the beam 9 may be adjusted both longitudinally and laterally to provide the proper angle. The beam 9 is also shown as provided with a longitudinal slot 14, in which the bolt 18 of a standard 15 is longitudinally adjustable, the standard having clamping jaws 16 and 17 secured together by the bolt 18 and nut 19. The jaws 16 and 17 are adapted to engage a flange 20 on the engine base 21 and the engine base is adapted to be moved laterally within said jaws when the nut 19 is loosened. The front of the engine base is supported upon a stabilizer 22, consisting of a hollow bar or pipe resting upon the saddle 23 provided with a concave seat 24 and having a U bolt 25 which embraces the stabilizer 22 and holds it in place. The U bolt 25 is adapted to pass through the base of the saddle and through a longitudinal slot 26 in the beam 9 so that the saddle may be adjusted longitudinally with respect to the beam and by loosening the nuts 27 on the U bolt, the stabilizer may be moved longitudinally of itself but transversely across the beam 9, as will be clearly apparent by reference to Fig. II.

By reference to Figs. II and III, it will be observed that the stabilizer is provided with an upwardly inclined end 28 connected to the seat support 29 by a clasp or U bolt 30, having its ends projecting through a bar 31 and secured thereto by means of the nuts 32 and 33. Therefore, when the nuts 32 and 33 are loosened, the up-turned end 28 may be turned or otherwise adjusted, as the occasion may demand. The clamps which secure the rear end of the base 21 to the stabilizer are best shown in Figs. V and VII, and as illustrated, they consist of an upper member 34 and a lower member 35. The upper member is provided with a concave, stabilizer-engaging seat 36, which is recessed at 37 to receive the head of a bolt 38, the bolt being adapted to pass through the flange 20 of the engine base 21 and be secured thereto by a bolt 39 so that the upper member 34 is rigidly fixed with respect to the engine base. The upper member is also provided with webs or projections 40 and 41, through which bolts 42 and 43 may pass. The ends of the bolts project through similar openings 44 and 45 in the webs or projections 46 and 47 of the lower member 35. The lower member is also provided with a concave, stabilizer-engaging seat 48, which is adapted to coöperate with the seat 36 when the two members are drawn together to tightly bind against the stabilizer 22.

There are two of these clamps shown in Figs. II and III, one at each rear corner of the base 21 and these clamps are designated as 49 and 50 and by reference to Figs. II and III, it will be observed that they are on opposite sides of the saddle or support 23. Therefore, when the clamps are secured in place and the jaws of the standard 15 are tightened, the engine base will be held rigid on the supporting beam 9.

It is one of the purposes of this invention to provide means whereby the engine may be readily set up by a single operator and since the engine base cannot be shifted easily to tighten the sprocket chain while the bolts are being adjusted, I have provided means whereby the single operator may make accurate and fine adjustments by operating a turn buckle. The device for shifting the engine is shown as consisting of two rods, one of which is designated 51 and provided with a hooked end 52 to engage the seat support. The other rod 53 has a hooked end 54 to engage an opening 55 in one corner of the engine base, the two rods being connected by a turn buckle 56, which may be turned to cause the engine to be shifted laterally in either direction.

By reference to Figs. II and III, it will be observed that the engine base is provided with a three-point suspension; that is, it is suspended from the standard 15 and the two clamps 49 and 50, thus eliminating the danger of cracking off the flange when the bolts are tightly drawn. The recesses 27 for the upper members of the clamps 49 and 50 receive the heads of the bolts so that the seats of the respective clamp members may tightly bind against the stabilizer without interference. This, I consider an important feature of my invention.

It is contemplated to ship the parts of the invention in a "knocked down" state for the purpose of reducing the bulk of shipment and to invite a systematic means of assembling the parts of the harvester, which may be described as follows:

The beam 9 is first placed across the corner of the harvester frame, the fastening devices 10, 11 and 13 are placed in position and tightened slightly to hold the beam in place, the standard 15 may then be placed upon the beam 9 and the stabilizer 22, with the brackets 49 and 50, may be connected to the saddle with the bent end of the stabilizer fastened to the seat support through the medium of the yoke or U bolt, as above described.

In different makes of harvesters, and many times different harvesters of the same make, the exact location of the seat support is not at first apparent and the parts have to be adjusted to properly locate it. In the present device, however, after the stabilizer 22 is clamped to the beam 9, the clamps 49 and 50 can be loosened and the end 28 of the stabilizer can be rotated so as to lie naturally adjacent to the seat support or post 29 to receive the clamp which secures it thereto. The engine is then brought into alinement with the operating parts of the harvester so that the sprocket 6 of the harvester alines with the sprocket 57 of the engine, thereby permitting the chain belt 7 to run in mechanical alinement with the two sprockets. The alinement of these two sprockets is accomplished by moving the bar 9 either back or forth so that the U bolt 13 slides in the slot 12 before being clamped tightly to the frame, or in case certain parts of the harvester prevent further adjustment of the beam 9, the standards 15 and the saddle 23 may be moved back or forth in the slots 14 and 26 respectively to permit the adjustment.

After the proper alinement of the sprockets, the next operation in the adjustment of the engine is to move it so as to obtain the proper tension on the belt 7. This is accomplished by moving the engine transversely of the harvester frame along the stabilizer, after loosening the clamps 49 and 50, and moving the engine until the proper tension is secured and then retightening the clamps.

This adjustment might be difficult for a single operator were it not for the fact that it is rendered comparatively easy through the medium of the rods 51 and 53 and the turn buckle 56, since by simply turning the turn buckle, the adjustment of the engine may be accomplished, as will be clearly apparent by reference to Figs. II and III.

When the harvester is to be transported from one destination to another, for example, along a road, a transport wheel 58 is usually introduced, as is well understood, the bull wheel being lifted off the ground at this time. I, therefore, find it expedient to so mount the engine mounting that no portion of the engine or any part of my invention will obstruct the transport wheel or interfere with its introduction or removal from the harvester frame. This is an important feature of the invention because it is necessary for the successful moving of the harvester frame along the country roads to utilize a transport wheel or its equivalent and so far as I am aware, it is impractical in the present day methods to use an engine mounting which would prevent the use of a transport wheel or which would interfere with its easy application to or removal from the harvester frame.

It will also be apparent by reference to the drawings that the entire weight of the engine is supported upon the rear of the end frame of the harvester, where it is best adapted to receive the weight and that the entire weight of the engine is practically imposed upon the stabilizer bar, which is best adapted to receive it, and it will be further apparent that the device can be readily assembled without special skill and substantially any adjustment may be effected to properly position the engine base.

What I claim and desire to secure by Letters Patent is:

1. In combination, a frame, an engine mounting comprising a supporting beam on the frame, a stabilizing bar on the supporting beam and frame, an engine adjustably mounted on said bar and beam, and means for adjusting said engine comprising a rod attached to said engine, a rod attached to a portion of the frame and a turn buckle between said rods for the purpose set forth.

2. In combination, a frame and a seat post, an engine mounting comprising a supporting beam mounted on the frame, a stabilizing bar mounted on the supporting beam and having a bent end, means for permitting said stabilizing bar to turn to bring the bent end adjacent the seat post, and means for clamping said end to said post.

3. In combination, a frame and a seat post, an engine mounting comprising a supporting beam mounted on the frame, a stabilizing bar adjustably mounted on the supporting beam, said stabilizing bar having a bent end, means for permitting said stabilizing bar to turn to bring the bent end adjacent the seat post, means for clamping the bent end to said seat post, clamps on said supporting beam and stabilizing bar for receiving an engine, and means for adjusting said clamps to adjust said engine for the purpose set forth.

4. In combination, a frame, having a transport wheel carried thereby, an engine mounting comprising a supporting beam mounted on the frame and extending adjacent one side of the transport wheel, a stabilizing bar mounted on the supporting beam and frame and extending adjacent another side of said transport wheel, and means for mounting an engine on said supporting beam and stabilizing bar clear of said wheel.

5. In an engine mounting, a frame, comprising a seat post, a supporting beam carried by the frame, a bar supported transversely on said beam, means for connecting the bar to the seat post, and engine-engaging means adjustably carried by the beam and bar.

6. In an engine mounting, a frame, a supporting beam carried by the frame, a bar supported across the beam and rotatably adjustable thereon, an inclined end on said bar to engage a support, a support, means for fastening the inclined end to the support, and engine-engaging means carried by the bar and beam.

7. In an engine mounting, a frame, a supporting beam carried by the frame, a bar longitudinally adjustably supported across the beam and rotatably adjustable thereon an inclined end on said bar to engage a support, a support, means for fastening the inclined end to the support, and engine-engaging means carried by the bar and beam.

8. In an engine mounting, a frame having a seat post, a supporting beam carried by the frame, a stabilizing bar connected to the beam and seat post, said stabilizing bar being longitudinally and rotatably adjustable on the beam, and engine-engaging means carried by the beam and bar.

9. In an engine mounting, an engine-supporting beam, a bar carried thereby, an engine-supporting clamp longitudinally adjustable on said beam, engine-supporting means on the bar and movable at an angle to the beam, and a mechanical means for shifting the engine with respect to the beam and bar.

10. In an engine mounting, an engine-supporting beam, a bar carried thereby, an engine-supporting clamp longitudinally adjustable on said beam, engine-supporting means on the bar and movable at an angle to the beam, and a mechanical means comprising anchored rods and a turn buckle for shifting the engine with respect to the beam and bar.

11. In an engine mounting, a frame and a seat support, a supporting beam carried by the frame, a transverse bar on the beam, an engine base carried by the beam and bar, and an engine shifter connected to the seat support.

12. In an engine mounting, a frame and a seat support, a supporting beam carried by the frame, a transverse bar on the beam, an engine base carried by the beam and bar, and an engine shifter connected to the seat support, said shifter comprising spaced rods and a turnbuckle between them.

13. In an engine mounting, a supporting beam, a stabilizing bar on the beam, an engine clamp on the bar, said clamp comprising two members having bar-engaging seats, one of said members having a bolt head-receiving recess in its seat and a bolt opening, and a bolt passing through the opening to engage the engine base.

14. In an engine mounting, a frame, a supporting beam carried by the frame, a bar having a horizontal portion supported on the beam and an inclined portion supported on the frame, and means for clamping an engine to the beam and bar.

15. In an engine mounting, a frame, a supporting beam carried by the frame, a clamp longitudinally adjustable on said beam, a bar having a horizontal section mounted in the clamp and an inclined portion mounted on the frame whereby the horizontal section may be set at the proper angle relative to the supporting bar irrespective of the longitudinal position of the clamp, and means for clamping an engine to the beam and bar.

16. In an engine mounting, an engine supporting beam, a bar carried thereby, engine engaging means on the beam and bar, and mechanical means for shifting the engine with respect to the beam and bar.

17. In an engine mounting, an engine supporting beam, a seat support, an engine supporting bar on said beam having one end inclined for engaging against said seat support, and means for adjustably connecting the bar to the seat support.

18. In an engine mounting, a frame, an engine supporting beam on said frame, a seat support on the frame, an engine supporting bar on said beam having one end inclined for engagement with said seat support, means for adjustably connecting said bar to the seat support, and means longitudinally adjustable on said bar for securing an engine to said bar.

19. In an engine mounting, a frame, a supporting beam on said frame, a bracket longitudinally adjustable on said beam, a clamp on said bracket, a support, a seat longitudinally adjustable on said beam, a stabilizing bar having a horizontal end rotatably and adjustably mounted in said seat, said stabilizing bar having an inclined end resting against said support, individual means for clamping said bar to said beam and support, clamps longitudinally adjustable on said bar, means for securing an engine to said clamps and in said bracket clamp, and an extensible rod for moving an engine and said clamps rotative to the beam and bar.

In testimony whereof I affix my signature.

HARRY E. SCHANK.